(12) United States Patent
Schlierbach et al.

(10) Patent No.: US 7,990,523 B2
(45) Date of Patent: Aug. 2, 2011

(54) AIMING TELESCOPE HAVING A RANGE FINDER

(75) Inventors: Armin Schlierbach, Leun (DE); Gerd Polzer, Wetzlar (DE); Matthias Heller, Hohenahr (DE)

(73) Assignee: Carl Zeiss Sports Optics GmbH, Wetzlar (DE)

( * ) Notice: Subject to any disclaimer, the term of this patent is extended or adjusted under 35 U.S.C. 154(b) by 897 days.

(21) Appl. No.: 11/891,173

(22) Filed: Aug. 9, 2007

(65) Prior Publication Data
US 2009/0296210 A1 Dec. 3, 2009

Related U.S. Application Data

(63) Continuation of application No. PCT/EP2006/001142, filed on Feb. 9, 2006.

(30) Foreign Application Priority Data

Feb. 10, 2005 (DE) .......................... 10 2005 007 916

(51) Int. Cl.
*G01C 3/08* (2006.01)
(52) U.S. Cl. .................................................... 356/5.01
(58) Field of Classification Search .................. 356/5.01
See application file for complete search history.

(56) References Cited

U.S. PATENT DOCUMENTS

| | | | |
|---|---|---|---|
| 3,464,770 A | 9/1969 | Schmidt | |
| 4,026,054 A * | 5/1977 | Snyder | 42/115 |
| 5,771,623 A | 6/1998 | Pernstitch et al. | |
| 6,583,862 B1 | 6/2003 | Perger | |
| 2005/0021282 A1* | 1/2005 | Sammut et al. | 702/150 |
| 2005/0252062 A1* | 11/2005 | Scrogin et al. | 42/119 |
| 2007/0175081 A1* | 8/2007 | Lacorte | 42/142 |

FOREIGN PATENT DOCUMENTS

| | | |
|---|---|---|
| DE | 1 210 360 | 2/1966 |
| DE | 71 23 329 | 6/1971 |
| DE | 28 41 612 | 4/1979 |
| DE | 33 29 589 A1 | 3/1985 |
| DE | 36 39 326 A1 | 5/1988 |
| DE | 44 38 955 C2 | 5/1996 |
| EP | 0 709 705 A2 | 5/1996 |
| WO | WO 00/77554 A1 | 12/2000 |

* cited by examiner

*Primary Examiner* — Thomas H Tarcza
*Assistant Examiner* — Luke D Ratcliffe
(74) *Attorney, Agent, or Firm* — Harness, Dickey & Pierce, P.L.C.

(57) ABSTRACT

An aiming telescope has an optical axis and a line of sight. Turrets are provided for adjusting the direction of the line of sight. A range finder is structurally connected with the aiming telescope. The range finder has a light source for emitting an emitted measuring beam. The emitted measuring beam runs outside the aiming telescope. It has a direction coinciding essentially with the direction of the line of sight. A transmission is provided for automatically adjusting the direction of the emitted measuring beam when the direction of the line of sight is adjusted. The light source is pivotably mounted on the aiming telescope. The transmission acts between the aiming telescope and the light source.

60 Claims, 11 Drawing Sheets

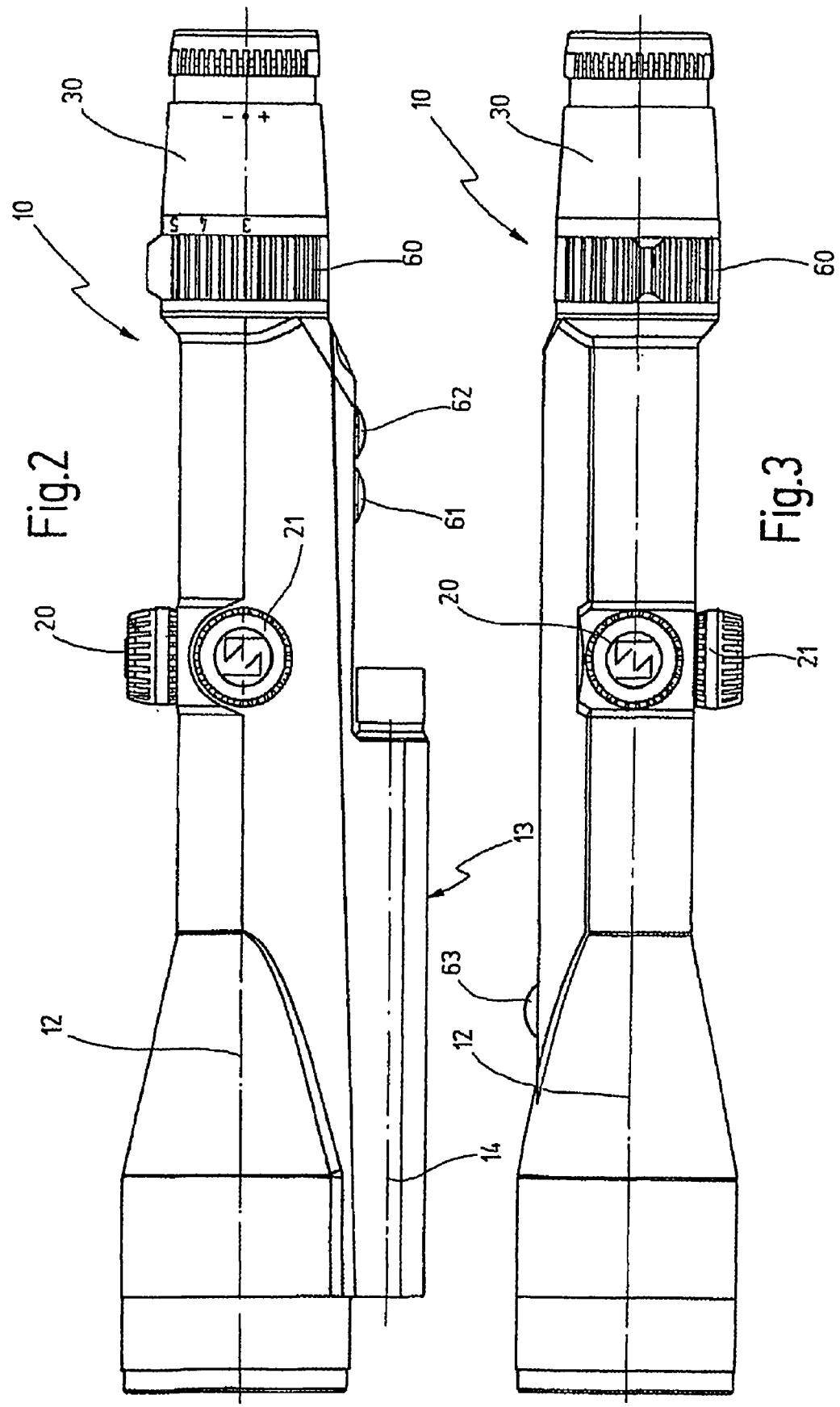

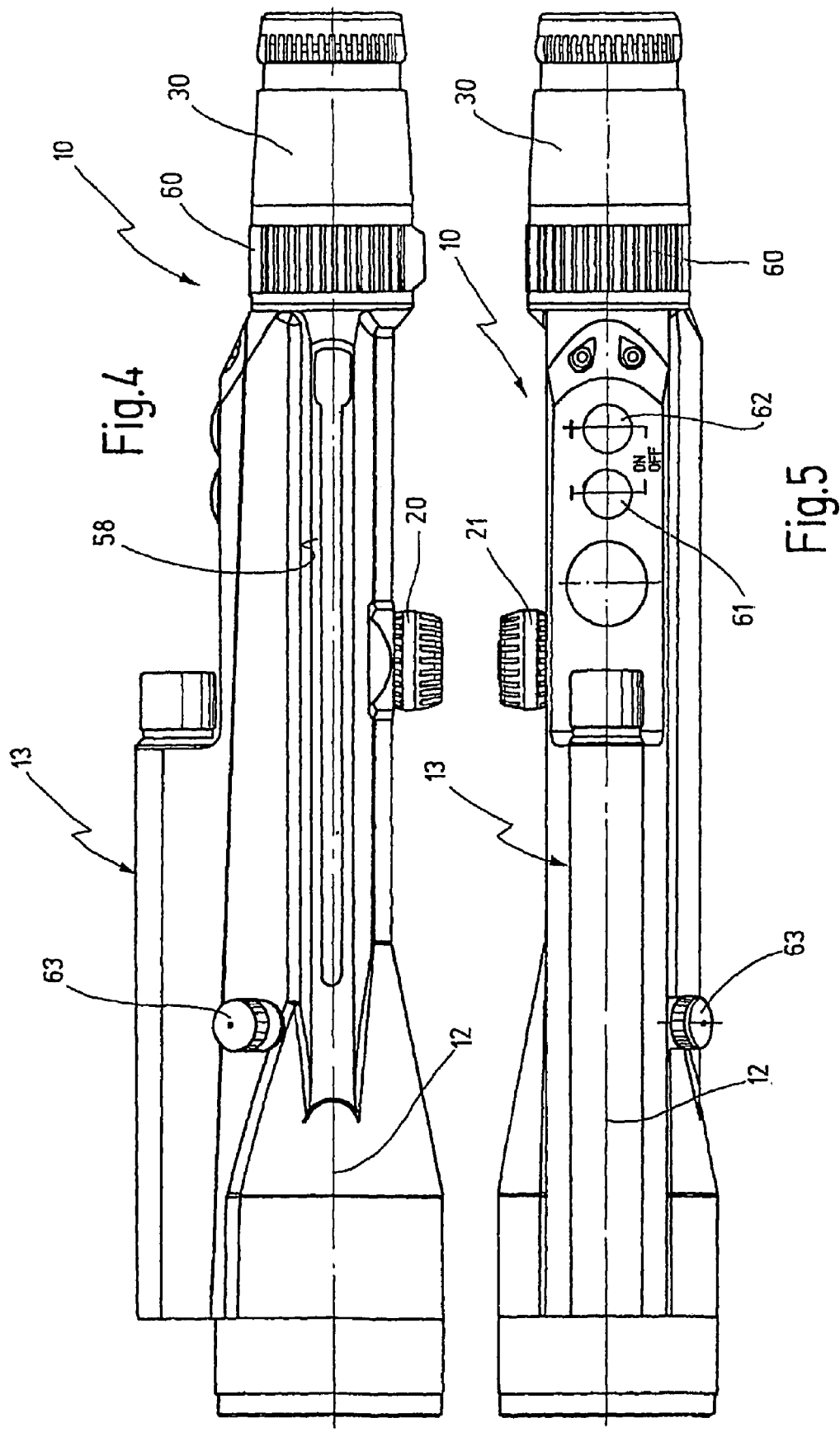

AIMING TELESCOPE HAVING A RANGE FINDER

CROSS REFERENCE TO OTHER APPLICATIONS

The present application is a continuation of pending International patent application PCT/EP2006/0001142, filed Feb. 9, 2006 which designates the United States and was published in German, and which claims priority of German patent application 10 2005 007 916.4, filed Feb. 10, 2005. The disclosure of the above application is incorporated herein by reference.

FIELD OF THE INVENTION

The invention is related to the field of aiming telescopes.

More specifically, the invention is related to aiming telescopes having an optical axis and a line of sight, first means for adjusting the direction of the line of sight, a range finder being structurally connected with the aiming telescope, the range finder having a light source for emitting an emitted measuring beam, the emitted measuring beam running outside the aiming telescope and having a direction coinciding essentially with the direction of the line of sight, and second means for automatically adjusting the direction of the emitted measuring beam when the direction of the line of sight is adjusted.

BACKGROUND OF THE INVENTION

An aiming telescope of the type specified above is known from U.S. Pat. No. 3,464,770.

It is well known to provide aiming telescopes with adjustment means, the so-called "turrets", which allow to adjust the line of sight within the aiming telescope in defined steps, either along a vertical axis or along a horizontal axis. For doing so one conventionally adjusts either the aiming mark or the objective lens. When doing so, the aiming telescope that had been "shot-in", i.e. adjusted at its manufacturing site for a certain ammunition and for a predetermined distance, may be re-adjusted such that precise shots are possible also for other distances and/or for other ammunition. Moreover, other spurious effects may be compensated for, for example a given aiming angle of the aiming telescope when the target is located at another height as the marksman, and, further, environmental influences, for example the direction or the intensity of a wind.

In some instances, aiming telescopes are additionally equipped with a range finder, in particular with a laser range finder. The laser range finder emits a very thin laser beam and computes the distance between the target and the marksman from the phase shift between the emitted beam and the beam reflected by the target. The point of impingement of the laser beam on the target may be mirrored into the aiming telescope so that the marksman has a visual control of the target point he is actually aiming at.

For that purpose, it is, of course, necessary that the laser beam and the line of sight of the aiming telescope be aligned exactly parallel (at least for large distances where the parallax has no influence) or coincide. In the last-mentioned case the range finder is integrated into the aiming telescope at least to such an extent that the laser beam is at least partially mirrored into the beam path of the aiming telescope.

Now, when the line of sight of the aiming telescope is adjusted by adjusting the aiming mark through actuation of the turrets, the parallelism or the coinciding of the line of sight and of the laser beam gets lost. The laser beam will then impinge on a point on the target that lies besides the target point that is actually aimed at.

From U.S. Pat. No. 5,771,623 there is known an aiming telescope which avoids this disadvantage by integrating the range finder into the aiming telescope, wherein the laser beam runs through the objective lens of the aiming telescope and it is the objective lens that is adjusted for adjusting the line of sight. By doing so, it is guaranteed that the laser beam and the line of sight still coincide even when the line of sight is adjusted. The emitted laser beam is mirrored into the beam path of the aiming telescope by means of a first beam splitter and the received laser beam is mirrored out of the beam path by means of a second beam splitter. Such a system, therefore, necessitates two beam splitters.

A similar solution is also known from U.S. Pat. No. 6,583,862. There, the degree of integration of the range finder is somewhat less. The range finder is configured as a unit that may be docked laterally to the aiming telescope, which,—in contrast to the solution according to U.S. Pat. No. 5,771,623 mentioned above—also opens up the possibility of an add-on solution. The range finder, when docked to the aiming telescope, is optically connected to the latter through a lateral opening. The laser beam is also mirrored into the beam path of the aiming telescope and mirrored out of the beam path by means of two beam splitters, one of which being located within the aiming telescope and the other within the docked range finder. For adjusting the line of sight a pivotably journaled inner tube is used which, inter alia, houses an inverting system and the one beam splitter.

As already mentioned above, these two prior art concepts necessitate two beam splitters each which must have a predetermined division ratio. Depending on the selection of the division ratio one either loses emitted power or received power. In any event, this results in a loss of range. Moreover, it is characteristic for this concept that the emitted laser beam as well as the received laser beam run though the objective lens together with the visual received beam. This results in reflections of the emitted laser beam at the objective lens and to errors within the received signal (so-called auto-errors).

German patent specifications DE 28 41 612 C1 and DE 36 39 326 C2 disclose devices for tanks in which a range finder is connected to the tank as a unit being entirely separate from the sighting device of the tank gun, and being adjustable in its alignment by means of a motor.

U.S. Pat. No. 3,464,770, mentioned at the outset, discloses a sighting device being coupled to a laser range finder. In this apparatus a laser emitter is arranged on top of the aiming telescope. A biconcave lens of a Galilei-system is arranged within the beam path of the laser emitter. This system apparently is used for widening the beam of the solid-state laser, as had been conventionally used at the time when this document was generated. The lens is adapted to be shifted in a vertical and in a horizontal direction transversely to the optical axis of the laser emitter. A reticle is arranged within the beam path of the aiming telescope below this lens. The reticle is likewise adapted to be shifted in a vertical and in a horizontal direction, transversely to the optical axis of the aiming telescope. This is effected under the control of control signals of a computer which computes the distance to the target from the laser emitter beams reflected from the target. The reticle and the biconcave lens are coupled mechanically, such that a shifting of the reticle in a vertical and/or in a horizontal direction effects the same shifting of the bi-concave lens in the same direction.

This prior art device has several disadvantages.

On the one hand, the direct rigid coupling between the reticle and the biconcave lens only allows a very coarse readjustment of the emitted measuring laser beam of the laser emitter relative to the line of sight.

On the other hand, the emitted measuring laser beam wanders out of the optical center of the biconcave lens when only the lens is transversely shifted whereas the laser emitter as well as the further lenses of the Galilei-system are held stationary with the housing, which results in an optical distortion of the emitted measuring beam.

Moreover, due to the shifting of the reticle the aiming mark wanders out of the center of the image field.

Further, the mechanical construction is difficult to make when the reticle is arranged in the vicinity of the eyepiece, whereas the laser emitter shall be located as close as possible to the objective lens.

Finally, the utilization of a laser emitter with a downstream optical system is disadvantageous also in view of the corresponding weight, and the optical system causes a considerable distance between the optical axes of the laser emitter and of the aiming telescope which, in turn, results in considerable parallax errors.

German patent specification DE 33 29 589 C2 discloses another aiming device with a laser emitter in which the optical axis of the laser emitter is adapted to be pivoted by laterally shifting a rotary wedge pair located within the beam path of the laser emitter. This is effected with a servomotor depending on signals of a computer which senses the rotary position of a mirror arranged within the beam path of the aiming telescope.

This device, therefore, has the same disadvantage as already discussed above, namely that the emitted measuring beam is optically distorted during pivoting.

SUMMARY OF THE INVENTION

It is an object underlying the invention to improve an aiming telescope of the type specified at the outset, such that the afore-mentioned disadvantages are avoided. In particular, an aiming telescope shall be provided having a compact design, a low weight, and, nevertheless, a high precision for what concerns the range measurement even at large distances.

In an aiming telescope of the type specified at the outset, this object is achieved in that the light source is pivotably mounted on the aiming telescope, and that the second means are configured as a transmission acting between the aiming telescope and the light source.

The object underlying the invention is, thus, entirely solved.

The invention, namely, provides for having the entire light source of the range finder pivoted and not just an optical element within the beam path of the latter. By doing so, the optical properties of the light source are entirely preserved. In particularly simple manner this is effected by coupling the light source being articulated at the aiming telescope with the aiming telescope via a transmission.

The aiming telescope according to the invention has substantial advantages as compared to prior art aiming telescopes in which the line of sight is adjusted via the objective lens. It integrates the range finder without giving up the conventional design and handling to which the users are accustomed. When doing so, no compromises are made with regard to the weight, because aiming telescopes according to the invention may be manufactured with an overall weight of about 1,000 g.

In a preferred embodiment of the invention, the first means are provided for manually adjusting the direction of the line of sight, wherein, preferably, the first means are provided with a first adjustment element for aligning the line of sight within a horizontal plane and a second adjustment element for aligning the line of sight in a vertical plane.

This measure has the advantage that, as known per se, the so-called "turrets" may be used for setting a horizontal or a vertical, respectively, offset of the line of sight. Of course, this does not exclude other types of adjustment, for example a servomotor adjustment.

Particularly preferred are embodiments of the invention in which the range finder is pivoted in a direction opposite to that of the line of sight.

This measure has the advantage that a design is selected in which the adjustment of the line of sight is effected in the area of the first image plane, in which the image of the target is upside-down.

Within the scope of the present invention the transmission is, in particular, configured as a lever transmission.

This measure has the advantage that elements may be used that are compact, have no play and have low friction, and the movement of which may be directly derived from the adjustment of the line of sight, for example from the turning of the "turrets", and which, therefore, do not necessitate a separate energy supply.

A particularly good effect is achieved when the light source is articulated at an objective lens sided end of the aiming telescope and an adverting system is articulated at an eyepiece sided end of the aiming telescope, and the free ends of the light source and of the inverting system facing each other are interconnected in articulation by a lever.

This measure has the advantage that a particularly compact design with a short lever transmission is achieved.

In the afore-mentioned embodiment it is particularly preferred when the light source is journaled in a ball bearing at an objective lens sided end of the aiming telescope, and, preferably, the inverting system is seated in a cone/ball bearing at the eyepiece sided end of the aiming telescope.

This measure has the advantage that the journaling and seating that is required for a two-axes adjustment at the line of sight, is achieved with simple means.

Preferred improvements of this embodiment with a lever transmission are characterized in that the lever is rigidly connected to the free end of the light source and is connected in articulation with the free end of the inverting system.

This measure has the advantage that the articulation that is required in the area of the lever is reduced to one articulation, wherein this articulation is located in the area of the inverting system, where there is sufficient space therefore.

In this regard it is preferred when the lever is connected with the free end of the light source so as to be adjustable in a first direction, in particular in that the lever is provided at its objective lens sided end with a first fork, that first prongs of the first fork embrace a stub at a free end of the light source, and that the first prongs are adapted to be shifted in their longitudinal direction on the stub and to be fixed at a predetermined position.

This measure has the advantage that a calibration of the lever transmission in a first direction, in particular in a lateral direction, becomes possible in a simple manner, for example by shifting and affixing the fork on the stub, for example by turning a nut tight on a threaded stub.

In an analogous manner the lever, in another preferred embodiment of the invention is provided with a second fork at its eyepiece sided end, the prongs of the second fork being provided with longitudinal grooves, and pins connected to the inverting system running within the longitudinal grooves.

This measure has the advantage that the required articulation in the area of the lever is made possible with one articulation only being very simple in its design and fulfilling the requirements with regard to freedom of play and low friction.

For the embodiment with fork-shaped ends of the lever it is preferred when the first fork defines a first plane with its first prongs, that the second fork defines a second plane with its second prongs, and that the first plane and the second plane enclose a right angle. Insofar it is, further, preferred when the lever has an objective lens sided front part and an eyepiece sided rear part, and the parts are interconnected such as to be adjusted along a second direction, wherein, in particular, the first direction and the second direction enclose a right angle. The front part, insofar, is, preferably, provided with the first fork and the rear part is provided with the second fork.

This measure has the advantage to ensure that the two assemblies connected by the lever may be adjusted and calibrated in two orthogonal directions with a minimum of components.

In the afore-mentioned embodiment a good effect is achieved in that the free end of the inverting system is configured by the free end of an inner tube of the aiming telescope.

This measure has the advantage that all components held within the inner tube, in particular the inverting group and the reticle remain unchanged in their relative position to one another, when the line of sight is adjusted.

In other preferred embodiments of the invention the transmission is configured as a cable pull transmission or as a servo drive.

These measures have the advantage that depending on the complexity that is still acceptable for a particular application, a correspondingly reliable and precise coupling between the aiming telescope and the range finder may be achieved.

In the context of the afore-mentioned types of transmissions it is preferred when the transmission engages an inverting system within the aiming telescope.

In other embodiments of the invention the transmission has a transmission ratio depending on a focal length of the aiming telescope.

This measure has the advantage that, in particular for zoom objective lenses one may set a transmission ratio that is optimized for the actual focal length.

Finally, a particularly simple design is achieved when the range finder is gimbaled at the aiming telescope.

In embodiments of the invention it is preferred when the light source comprises a laser diode.

This measure has the advantage that a component is used having a beam of light that does not require a complicated optical system so that a light and narrow design becomes possible. By doing so the parallax is reduced as compared to prior art systems.

In so far it is preferred when the light source has a focal length of about 12 mm.

This measure has the advantage that an extremely short design is achieved that operates also for larger distances in the range of 1,000 m and more at high precision.

The aiming telescope, preferably, comprises an objective lens having at least one individual lens being rigidly connected to an outer tube of the aiming telescope.

This measure has the advantage that the objective lens is configured tight. If, preferably, a mirror-coating is added, the transmission properties may be optimized, namely for the visible range as well as for the wavelength of the laser light of the range finder.

The aiming telescope according to the present invention, preferably, comprises an electric current supply with a battery, and the battery is resiliently held axially at its positive electrode.

This measure has the advantage that long-life batteries may be used in which, necessitated by the design thereof, the positive electrode is located on a ceramic component which would otherwise be damaged during an impact load.

The battery is, preferably, housed in a cavity configuring a rearward extension of the range finder.

This measure has the advantage that a compact design is achieved.

In other embodiments of the invention the inverting system, as known per se, comprises a beam splitter at its objective lens sided end.

The beam splitter, insofar, is preferably provided with a first prism and a second prism, the prisms adjoining each other in a boundary plane, the boundary plane and the optical axis enclosing an angle (cc) in the range of between 50° and 70°, in particular about 60°.

This measure has the advantage that in contrast to prior art systems with 45° the layer system in the area of the boundary plane may be drastically simplified. With this coding an optimum mirroring-out of the laser beam and an optimum transmission of the visible light becomes possible. For a splitter cube with 60° the reflection ratio for a wavelength of 905 nm is about 90% as compared to about 60% for a design with 45°.

Insofar, it is preferred when a layer system within the boundary plane has a maximum of sixty individual layers, preferably a maximum of forty individual layers.

The layer system insofar, preferably, is composed of alternating hafnium layers and silicon oxide layers.

In embodiments of this beam splitter a received measuring beam impinging along the optical axis on the objective lens sided first prism is deflected at the boundary plane away from the optical axis, then it runs through the first prism, exits from the first prism at a surface thereof, and is guided onto a sensor, the sensor surface of which being arranged parallel to the surface. When doing so the received measuring beam is, preferably, deflected to impinge under right angles onto the sensor surface.

This measure has the advantage that the beam path is optimized and that the sensor is operated at its best efficiency.

Insofar, it is particularly preferred when the first prism is provided with a flattened corner at its objective lens sided lower edge, a corner surface being inclined relative to the optical axis such that a received measuring beam coming in along the optical axis and being reflected at the inclined boundary plane impinges under right angles on the surface of the flattened corner.

This measure has the advantage that the exit of the received measuring beam from the first prism is optimized.

It is, further, preferred when an band pass filter is provided upstream the sensor, wherein, preferably, the band pass filter is arranged between the first prism and the sensor.

This measure has the advantage that the intrusion of spurious light into the sensor is minimized.

In this context it is preferred when the band pass filter is configured as a cut-off filter, in particular when the cut-off filter consists of two individual filters being cemented onto each other.

This measure has the advantage that a particularly flat and effective design is achieved.

In embodiments of the invention an eyepiece sided surface of the objective lens sided second prism defines a second image plane of the aiming telescope.

In this case a received measuring beam impinging along the optical axis on the objective lens sided first prism is deflected at a point of impingement on the boundary plane away from the optical axis, then it runs through the first prism, exits from the first prism at a surface thereof, and is guided onto a sensor surface of a sensor, the distance between the point of impingement and the second image plane being as large as the distance between the point of impingement and the sensor surface.

This measure has the advantage that a centered reticle is made possible in the center of the field of vision at any time.

In this design it is preferred when a field lens is cemented on the eyepiece sided surface of the second prism.

This measure has the advantage that no dirt may enter between the beam splitter and the field lens. Moreover, two anti-reflection layers less are needed. Moreover, one achieves a high transmission because one has one air-filled cavity less.

It is, further, preferred when the beam splitter is arranged within the inverting system in a form-fitting manner so as to be secured against rotation.

In embodiments of the invention the inverting system is journaled in a cone/ball bearing at the eyepiece sided end of the aiming telescope.

This measure has the advantage, already mentioned above, that the required articulation may be achieved by simple design measures.

Insofar, it is preferred when the cone/ball bearing is configured by an inner conical seat on an inner surface of an outer tube of the aiming telescope and by a ball head arranged at the eyepiece sided end of an inner tube of the aiming telescope. The ball head is, preferably, supported against the outer tube via a spring.

This measure has the advantage that the required components may be arranged within a minimum of space.

In the inventive design it is preferred that a second image plane is configured at the eyepiece sided end of the inverting system Insofar, it is preferred that a reticle is arranged within the inverting system essentially at the location of the second image plane.

The reticle, insofar, is preferably rigidly connected to the inverting system.

In the afore-mentioned example it is preferred when a display for an alphanumerical indication is arranged within the field of vision on the eyepiece side of the reticle located essentially at the second image plane.

As compared to conventional arrangements with a display arranged besides the field of vision, necessitating to mirror same into the field of vision, this measure has the advantage that no further beam splitter with corresponding optical elements for mirroring-in are required. This also contributes to a high transmission, as well as to a low weight and to low manufacturing costs.

According to the invention the reticle is adapted to be illuminated, as known per se, and the illumination intensity is adapted to be adjusted, and the light intensity of the alphanumerical indication of the display is adapted to be adjusted depending on the illumination intensity of the reticle.

This measure has the advantage that the display light may not be brighter than the image of the target.

In the afore-mentioned embodiment it is preferred that for adjusting the illumination intensity of the reticle there is provided on the aiming telescope at least one actuation knob, and that the at least one actuation knob is also adapted to switch the illumination on and off, resp.

This measure has the advantage that several functions may be effected with only a few actuation elements.

This holds true in particular when for increasing or decreasing the illumination intensity of the reticle there are provided two actuation knobs, and the illumination is adapted to be switched on and off, respectively, by simultaneous actuation of both actuation knobs.

Further, it is preferred in an aiming telescope of the present invention when a switch for actuating the range finder is provided, wherein the switch effects the emission of a short-time emitted measuring beam, and means are provided for enabling the emission of another emitted measuring beam only after a predetermined time interval has lapsed.

This measure has the advantage that the protective regulations for the corresponding laser class can be respected.

Insofar, it is, further, preferred when the switch is adapted to be operated remotely.

This measure has the advantage that the aiming telescope may be combined with arbitrary fire arms and that the marksman may effect a range finder measurement also from a hidden position.

Finally, the aiming telescope according to the present invention may be provided with a rail for affixing it to a firearm, the rail and the range finder being arranged at peripheral positions of the aiming telescope offset by 90°.

This measure has the advantage that in the normal operational position of the aiming telescope on top of the barrel of a firearm the range finder is arranged laterally, so that the entire height of the arrangement is limited.

Further advantages will become apparent from the description and the enclosed drawing.

It goes without saying that the features mentioned before and those that will be mentioned hereinafter may not only be used in particularly given combination, but also in other combinations, or alone, without leaving the scope of the present invention.

BRIEF DESCRIPTION OF THE DRAWINGS

Embodiments of the invention are shown in the drawing and will be explained in further detail throughout the subsequent description:

FIG. 2 shows a top plan view on a practical realization of the aiming telescope as shown in FIG. 1;

FIG. 3 shows a first side elevational view of the aiming telescope of FIG. 2;

FIG. 4 shows a view of the aiming telescope of FIG. 2 from below;

FIG. 5 shows a second side elevational view of the aiming telescope of FIG. 2;

DETAILED DESCRIPTION OF THE PREFERRED EMBODIMENTS

Figure 1:
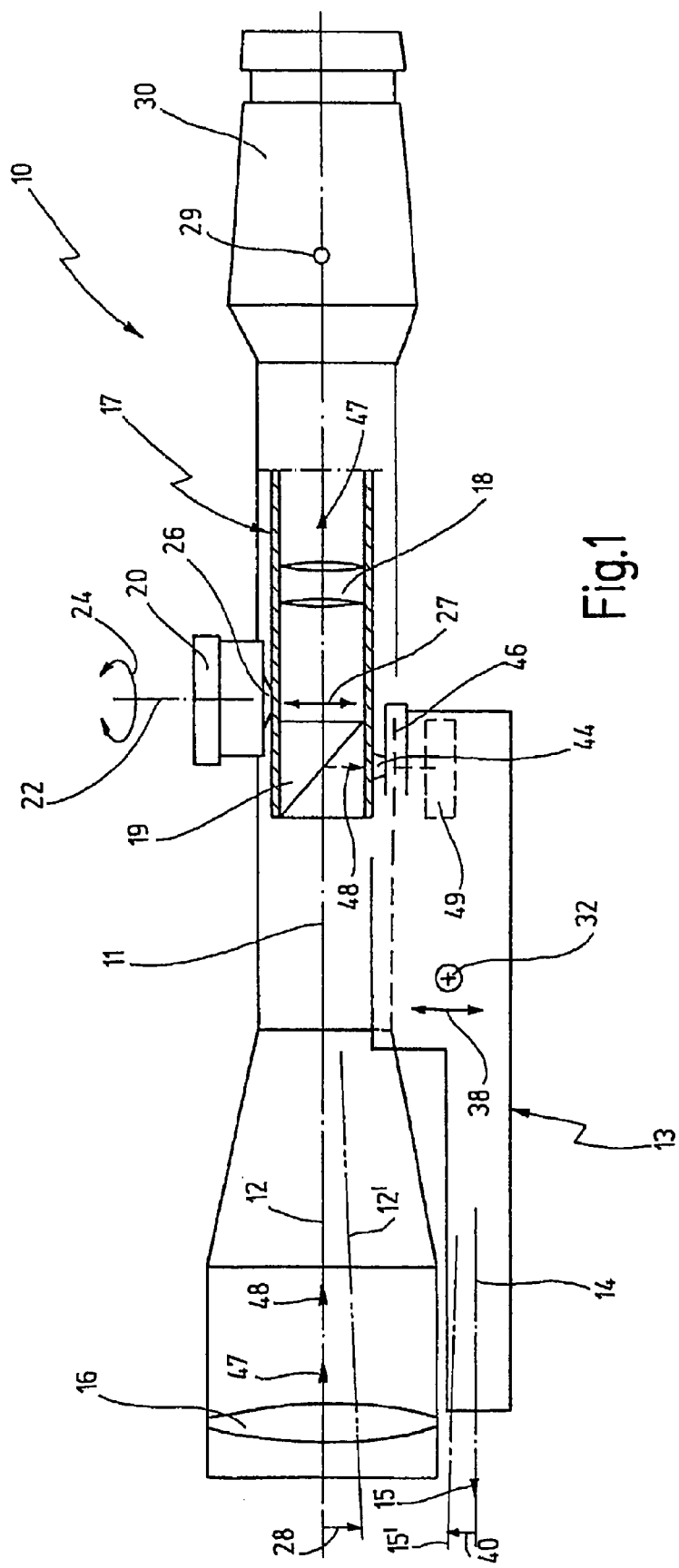
FIG. 1 shows a highly schematic top plan view of an embodiment of an aiming telescope according to the present invention.

In FIG. 1 reference numeral 10 as a whole designates an aiming telescope. The aiming telescope 10 has an optical axis 11. A line of sight 12 of the aiming telescope 10 coincides with the optical axis 11 in the basic operational position of the aiming telescope 10.

A range finder 13, in particular a laser range finder, is mounted to the aiming telescope 10. The range finder 13 has a longitudinal axis 14 and is mounted to the aiming telescope 10 such that an emitted measuring beam 15 emanating from the range finder 13 along the longitudinal axis 14 is normally parallel to the optical axis 11 and, hence, also parallel to the line of sight 12. Thereby the emitted measuring beam 15 impinges on the target exactly at the point lying on the line of sight 12.

An inner tube 17 being adapted to be pivoted relative to the optical axis 11 is arranged within the aiming telescope 10 on the side opposite to an objective lens 16. The inner tube 17 is adapted to be pivoted with its objective lens sided free end about an articulation point 29 in a horizontal direction and in a vertical direction. The articulation point 29 is located in the area of an eyepiece 30 of the aiming telescope 10. An inverting system 18 as well as a beam splitter 19 are arranged within the inner tube 17.

For adjusting the inner tube 17 and, thereby, the line of sight 12, the aiming telescope 10 is provided with two "turrets" 20, 21 at positions peripherally offset by 90°. Only one of the turrets is shown in FIG. 1 at 20. The turret 20 is adapted to be manually turned about an axis 22 as indicated by an arrow 24. Thereby, a transmission element 26 is displaced in a horizontal direction. The transmission element 26 engages the inner tube 17 and pivots same in the front area relative to the optical axis 11 in a lateral direction, as indicated by an arrow 27. Upon actuation of the vertical turret 21 a corresponding displacement of the inner tube 17 is effected in the vertical direction.

The lateral pivoting of the inner tube 17 to the left-hand side, as seen from eyepiece 30, has the effect that the line of sight is displaced from 12 to 12', as shown by an arrow 28.

In order to make sure that the relation between the emitted measuring beam 15 to the sighted target does not get lost when the line of sight is displaced from 12 to 12', the range finder 13 is pivoted about a joint 32 via which it is attached to the aiming telescope 10. The pivoting must be effected in an opposite direction because the target image is upside-down in the first image plane and the first image plane is located within the inverting system 18. The joint 32, preferably, is configured as a gimbal, such that the range finder 13 with its longitudinal axis 14 can follow a horizontal adjustment as well as a vertical adjustment of the line of sight 12, 12'.

By doing so the emitted measuring beam 15 is pivoted to 15', as indicated by an arrow 40.

In order to make sure that the range finder 13 can automatically follow the adjustment of the line of sight 12, another transmission element 44 is arranged at the inner tube 17 which, for example cooperates with a lever 46, which, in turn, effects the movement of the range finder 13 about the joint 32. Various types of transmissions may be used for this transmission connection, for example the already mentioned lever transmission or a cable pull transmission or a servomotor system. The transmission ratio is, preferably, set depending on the focal length of the aiming telescope 10. A preferred embodiment of the invention utilizes a lever transmission that has no play and only little friction. This will be explained further below with respect to FIGS. 8 through 11.

The light reflected by the target and consisting of a visual signal 47 and a received measuring beam 48, enters into the objective lens 16 of the aiming telescope 10. It is then divided at the beam splitter 19, wherein the received measuring beam 48 impinges on a receiver 49 within the range finder 13 where it is further processed. As an alternative, the received measuring beam 48 may also be directly received by the range finder.

A practical embodiment of the aiming telescope 10 shown only very schematically in FIG. 1 shall now be described with regard to FIGS. 2 through 14. Like reference numerals will be used for like elements therein.

First, the elements of the aiming telescope 10 that can be seen from outside, shall be explained with regard to FIGS. 2 through 7.

Figure 14:
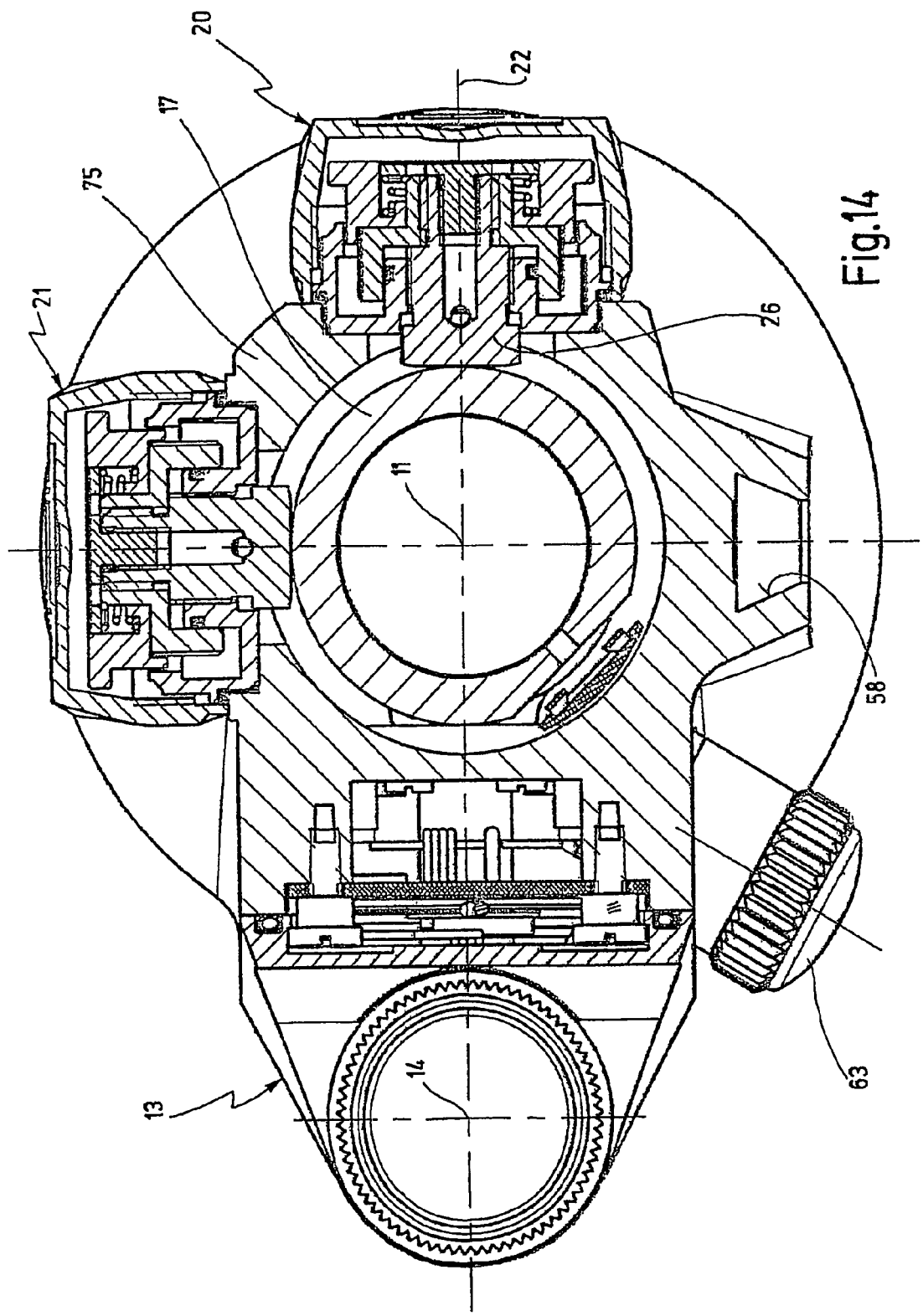
FIG. 14 on an enlarged scale shows a radial cross-sectional view in the plane XIV-XIV of FIG. 8.

The aiming telescope 10 is put on top of a barrel of a firearm, in particular a rifle, and is mounted thereto by means of a rail 58 that can clearly be seen in FIGS. 4 and 14. As can clearly be seen from FIG. 6, the range finder 13 is then positioned on the left-hand side of the aiming telescope 10, as viewed from the marksman's position, i.e. from the eyepiece side. The rail 58 is, preferably, designed as disclosed in U.S. Pat. No. 4,959,908, the disclosure of which being referenced to for the sake of simplicity.

At the eyepiece sided end of the aiming telescope 10 there is provided a ring 60 for adjusting a magnification of the aiming telescope 10. This is referred to in the art as a "V-exchanger". Via an engagement pin and a groove the ring 60 effects that lenses within the eyepiece 30, for example two such lenses, are axially displaced, such that the overall magnification of the aiming telescope 10 is varied accordingly. FIG. 2 in this regard shows a scale for the magnification factor besides the ring 60.

On the left-hand side of the aiming telescope 10, as viewed from the marksman's position, there are provided two knobs 61 and 62, as can particularly be seen from FIG. 5. The knobs 61 and 62 are used for switching the electronics of the aiming telescope 10 on and off, and also allow the setting of the intensity of the illumination of the reticle, as will be explained later.

At the objective lens sided end of the aiming telescope 10 there is provided a switch 63 on the left downward side, as seen from the marksman's position, as becomes particularly apparent from FIGS. 4 through 7. The switch 63 is used for switching on and operating the range finder 13. The range finder 13 is immediately operable after switching it on, i.e. the range finding is triggered without a significant delay time ($\leq 100$ msec) i.e. in practice immediately after the actuation of the switch 63. By actuating the switch 63 a light flash of the laser incorporated within the range finder 13 is triggered and the distance is calculated and displayed. In view of the applicable protective regulations for lasers of class 1 the next measurement may only be made after a time interval of 3 sec has lapsed. Preferably, the range finder 13 remains in a standby state after the first switching on. For minimizing the current consumption an automatic switch-off device may be provided.

The switch 63 is configured such that a connector of a cable may be connected thereto in order to effect a remote triggering of the range finder 13.

Figure 6:
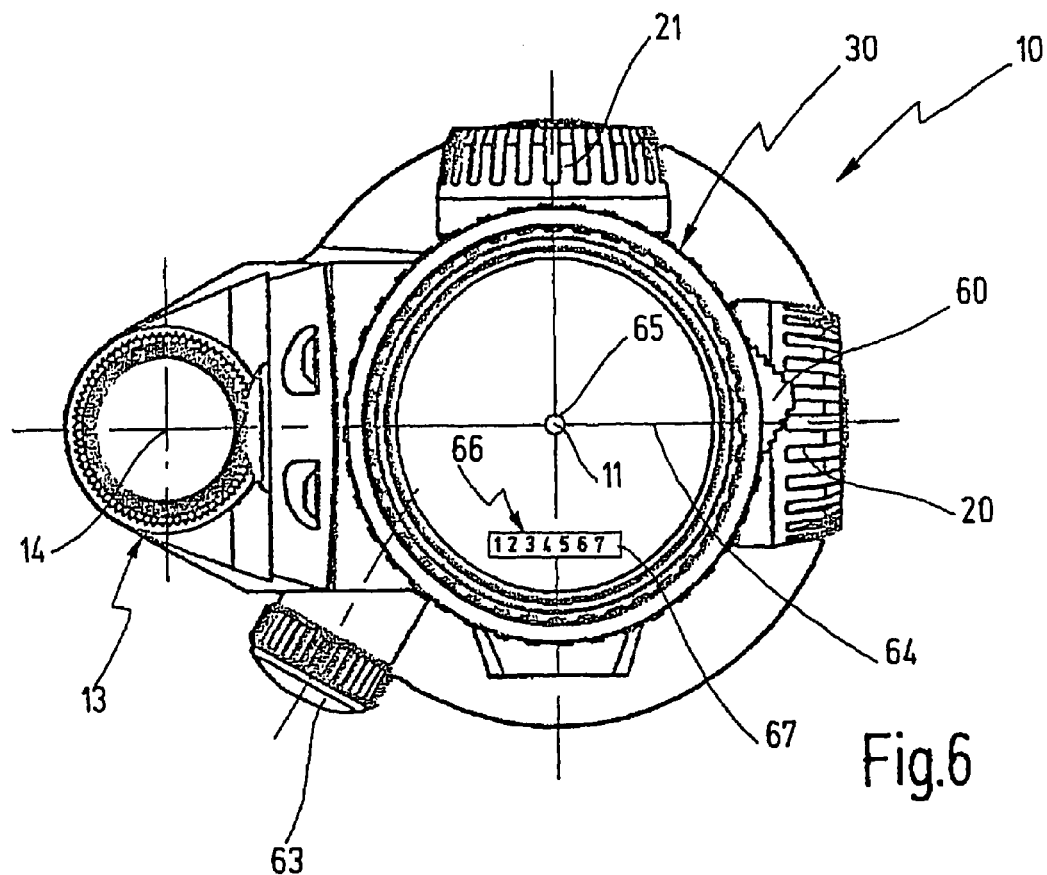
FIG. 6 on enlarged scale shows a view of the aiming telescope of FIG. 2 as seen from the eyepiece side.
Figure 7:
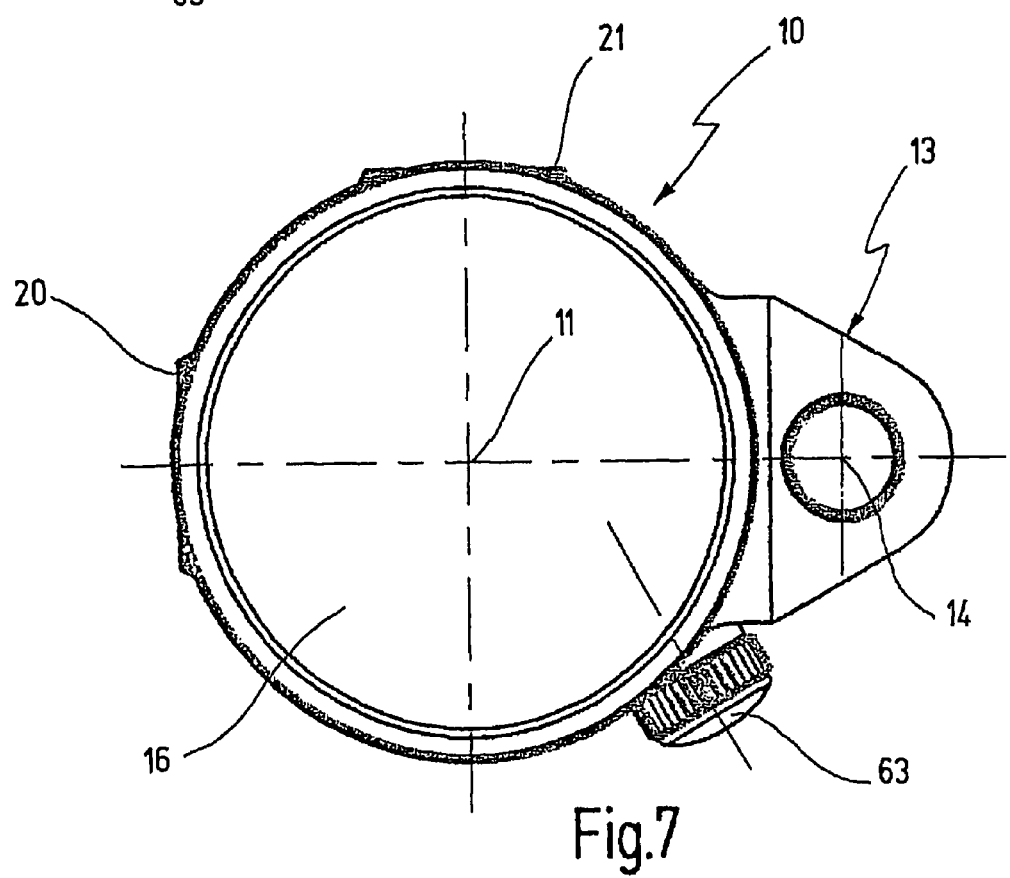
FIG. 7 on a likewise enlarged scale shows a view of the aiming telescope of FIG. 2 from the objective lens side.

FIG. 6 shows a view of the aiming telescope 10 as viewed by the marksman. Within the eyepiece 30 the marksman sees a reticle with an aiming mark, in the embodiment shown a crosshair 64, the center of which is marked with a point 65. The point 65 may be illuminated, as known per se.

Below the aiming mark there is provided a display 66 which is used for displaying alphanumerical symbols. The display 66 is, preferably, provided with a 7-segment-indication. On the display 66 one can, for example, indicate the distance measured by the range finder 13 as a numerical value together with the appropriate unit, e.g. "630 m".

As already mentioned, the intensity of the illumination of the reticle, in the example shown the point 65, may be increased or decreased by means of the knobs 61 (+) and 62 (−). Insofar, it is particularly preferred when upon an adjustment of the intensity of the illumination of the point 65 the intensity of the brightness of the display 66 is automatically varied accordingly. If, for example, a hunter sets the reticle darker when the daylight fades, this automatically also reduces the brightness of display 66. Thereby one avoids that the display 66 is brighter than the image field.

If the knobs 61 and 62 are actuated simultaneously, the electronics of the aiming telescope 10 as a whole is switched on or off, respectively.

Design details of the aiming telescope 10 shall now be described with regard to FIGS. 8 through 14.

Figure 8:
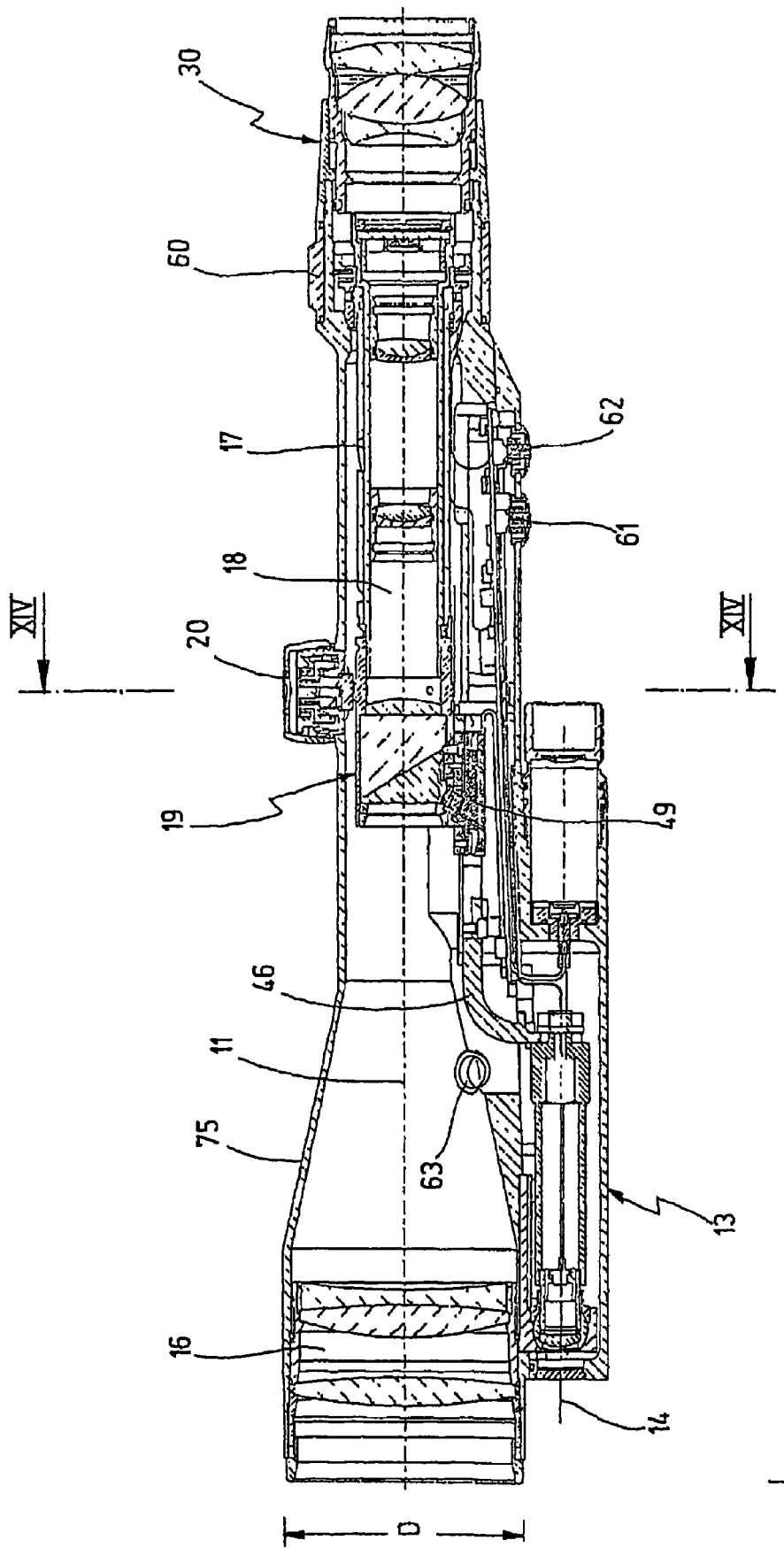
FIG. 8 shows a horizontal cross-sectional view of the aiming telescope of FIG. 2.

FIG. 8 as a detailed horizontal cross-sectional view is an illustration similar to that of FIG. 1. It shows an entire view of further details of the embodiment of the aiming telescope 10. Four areas of FIG. 8 are shown in FIGS. 9, 10, 12 and 13 on an enlarged scale. The aiming telescope 10 of FIG. 8 has an entire length L=365 mm. The outer diameter in the area of the objective lens 16 is D=62 mm. All subsequently given dimensions, tolerances and the like are related to these dimensions.

Figure 9:
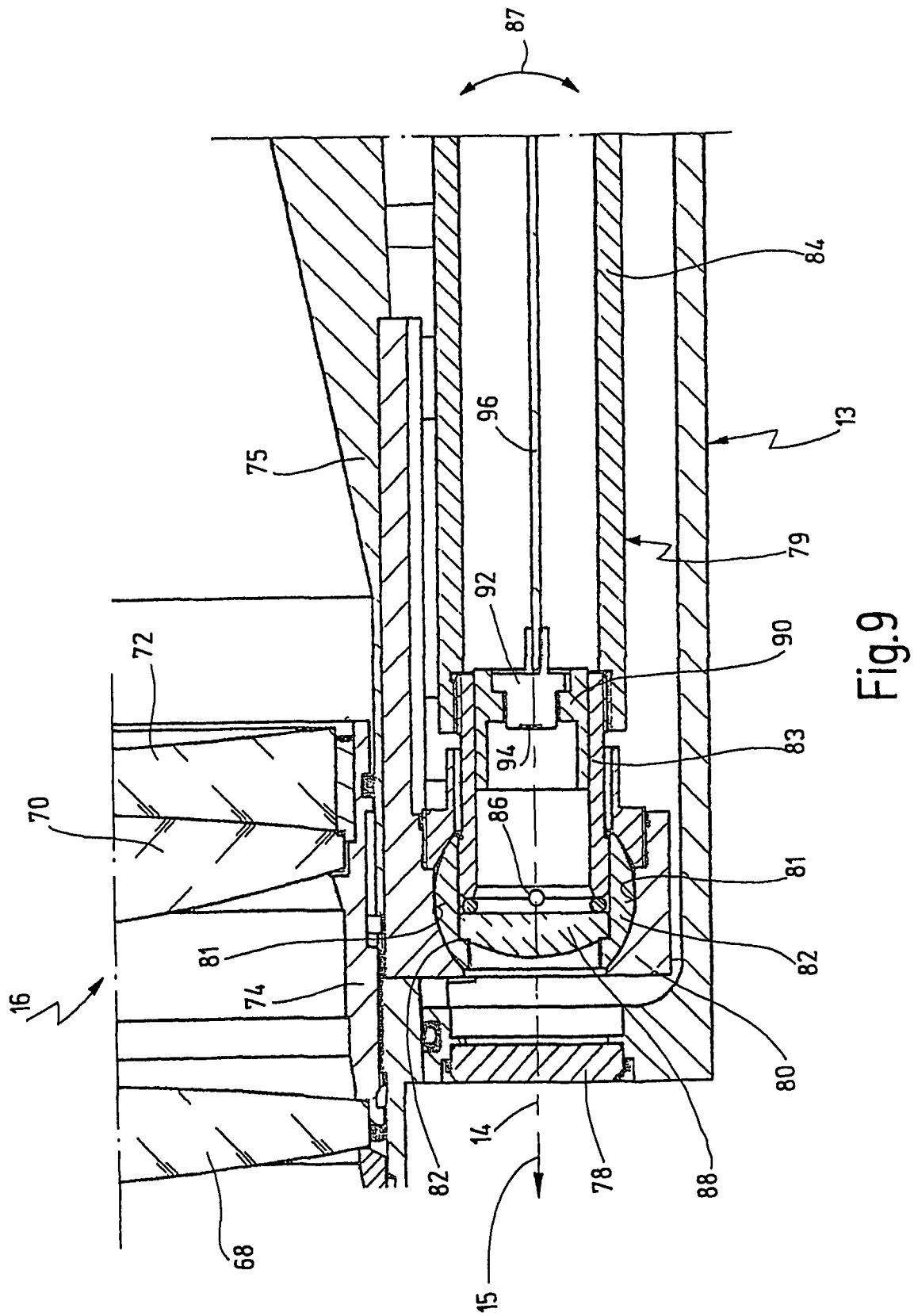
FIG. 9 on an enlarged scale shows a first detail from the objective lens sided area of the horizontal cross-sectional view of FIG. 8.

FIG. 9 shows the left downward area in FIG. 8, i.e. essentially the front end of the range finder 13.

The objective lens 16 in the embodiment shown has three individual lenses 68, 70 and 72. The lenses 68, 70 and 72 are attached to a barrel 74, for example by cementing. Due to the fact that the barrel 74, in turn, is rigidly connected to an outer tube 75 of the aiming telescope 10, the lenses 68, 70 and 72 are rigidly connected to this outer tube 75. Therefore, they are not moved upon adjustment of the line of sight 12. The inner space of the aiming telescope 10, therefore, is entirely sealed towards its front end.

The objective lens 16 is provided with an anti-reflection coating, i.e. it is optimized in its transmission for the visible range as well as for a wavelength range of between 900 and 910 nm wavelength.

The range finder 13 is provided with an outer tube 76 which, in turn, is laterally attached to the outer tube 75. The outer tube 76 is provided with a window 78 at its front side shown left in FIG. 9. Within the outer tube 76 there is provided a so-called light pen 79, i.e. a light source emitting a thin beam of light. The light pen 79 at its front end is articulated pivotable at the outer tube 76.

For that purpose a bearing shell 80 is connected to the outer tube 76. The bearing shell 80 is provided with two spherical bearing seats 81. The bearing seats 81 receive a ball head 82 which is plugged onto a front end of a sleeve 83 being arranged coaxially to the axis 14 of the range finder 13. The shell 84, in turn, is coaxially seated on a front portion of an inner tube 84 of the light pen 79. The bearing configured by the bearing seat 81 and the ball head 82 has an articulation point 86. The inner tube 84, and, thereby, the light pen 79 may, thereby, be pivoted with its free end shown left in FIG. 9 as well in a horizontal as in a vertical direction. The pivoting in the horizontal direction is indicated in FIG. 9 by an arrow 87.

The ball head 82, further, holds a lens 88 which is seated centrally on the axis 14 of the range finder 13. A support 90 for a laser diode 62 is coaxially attached to the end of the sleeve 83 shown right in FIG. 9. The laser diode 92 has a light point 94 lying within the axis 14 left in FIG. 9. Thereby, the laser diode 92 in the alignment of the inner tube 84 shown in FIG. 9 being coaxial to the axis 14 can emit the emitted measuring beam 15 along the axis 14. The emitted measuring beam 15, preferably, has a wavelength in the range of about 900 nm.

The laser diode 92, preferably, has an extremely short focal length of e.g. 12 mm. Accordingly, the lens 88 configuring the objective lens 16, has a diameter of about 10 mm. The length of light pen 79 may, thereby, be kept short. The light pen 79 may be used for distances to the target of more than 800 m, under certain circumstances also for more than 1,000 m and more. In practice the lower limit for the range finding should be about 10 m.

On the rear side of laser diode 92 there is provided a circuit board 96. The circuit board 96 carries the electronic components (not shown) necessary for the supply and the control of the laser diode 92.

Figure 10:
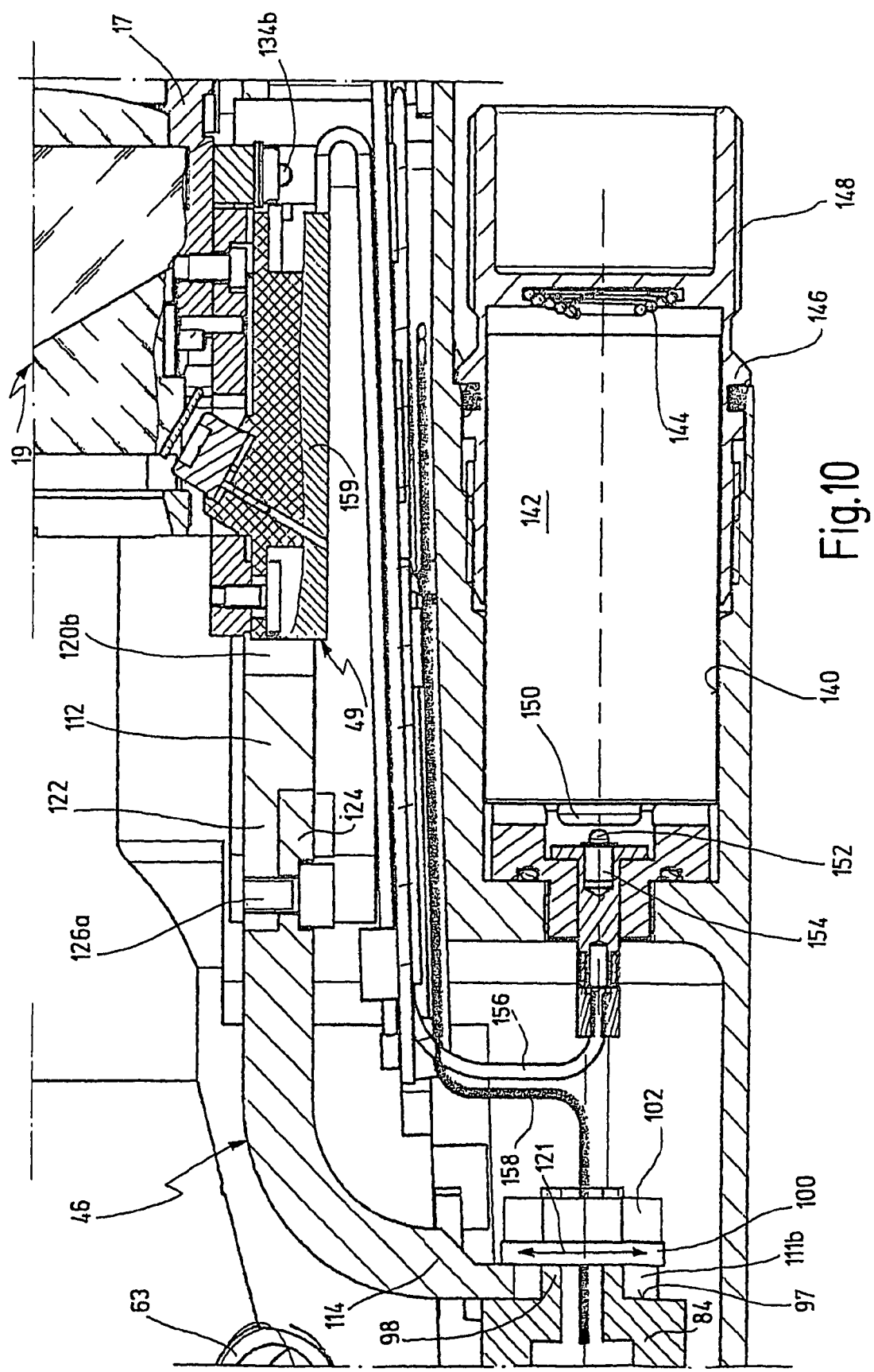
FIG. 10 on an enlarged scale shows a second detail from a middle, lower area of the horizontal cross-sectional view of FIG. 8.

FIG. 10 shows the middle downward area in FIG. 8, namely essentially the transmission with the lever 46.

The inner tube 84 of the range finder 13 is terminated in FIG. 10 at its right-hand end via an annular shoulder 97 by a threaded stub 98. A washer 100 is pushed onto threaded stub 98 and a nut 102 is screwed thereon, the nut effecting the attachment of the lever 46 at the end shown left in FIG. 10.

Figure 11:
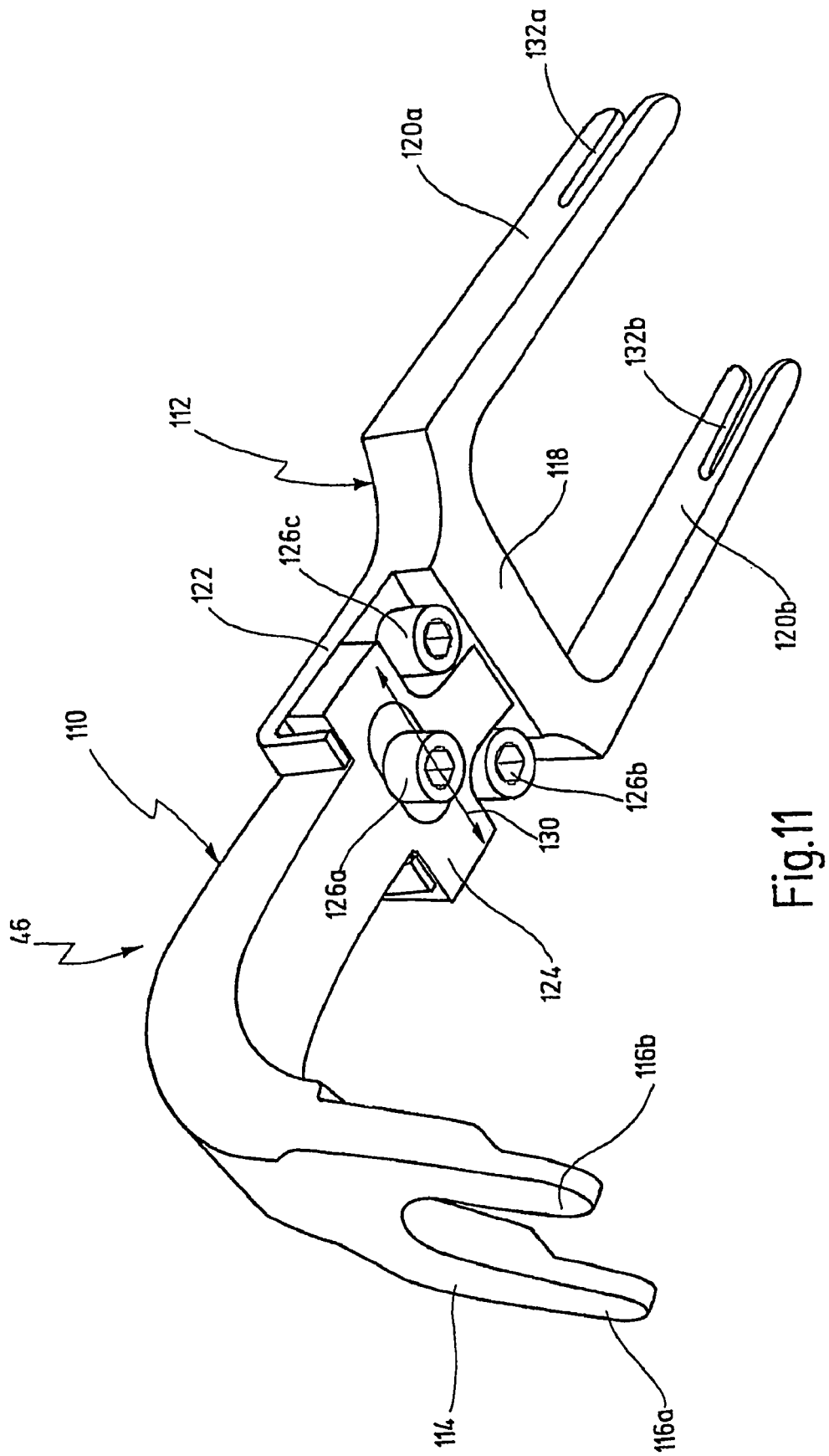
FIG. 11 shows a perspective view of a lever.

In FIG. 11 the lever 46 is separately shown in a perspective view. The lever 46 consists of two parts, namely a front part 110 shown left in FIG. 11 and a rear part 112 shown right in FIG. 11. The front part 110 is terminated at its front end by a first fork 114 being bent about 90°. It has first prongs 116a, 116b which, in FIG. 11, extend downwardly and define a vertical plane that extends transversely relative to the axis 14. The rear part 112 is terminated at its free end by a second fork 118 having second prongs 120a, 120b, which, in FIG. 11, define a horizontal plane extending parallel to the axis 14.

The first prongs 116a and 116b are stuck onto threaded stub 98. The first prong 114 may be fixed there by tightening the nut 112 and may concurrently be calibrated in a horizontal direction, as indicated by an arrow 121.

The rear end 112 at its end shown left in FIG. 11 is provided with a claw 122 embracing a flange 124 at the right end of the front part 110. By means of calibration screws 126a, 126b and 126c the parts 110 and 112 may be screwed together and, concurrently, be calibrated in a vertical direction, as indicated by an arrow 130.

The second prongs 120a and 120b are provided with longitudinal grooves 132a and 132b. Pins 134a and 134b being rigidly connected to the inner tube 17 of the aiming telescope 10 run along these longitudinal grooves 132a and 132b in the assembled condition of lever 46. Only one of the pins 134a, 134b is shown in FIG. 10 at 134b.

The lever 46 configures a transmission having no play and little friction which transmits the pivoting movement of the inner tube 17 of the inverting system 18 in an opposite direction onto the inner tube 84 of the light pen 79 of the range finder 13. If, namely, the objective lens sided free end of the inner tube 17 is adjusted laterally (in the illustration of FIG. 10 downwardly) by actuating the first turret 20, then the pins 134a and 134b running along the longitudinal grooves 132a, 132b take along the second fork 118 downwardly. As the second fork 118 is rigidly connected with the first fork 114 and the latter is likewise rigidly screwed to inner tube 84, the eyepiece sided free end of the inner tube 84 follows this movement. As the inner tubes 17 and 84 are articulated at opposite ends and face each other with their free ends coupled together, this results in movement in opposite directions, during which, for example, a pivoting of the inner tube 17 to the left-hand side results in a pivoting of the inner tube 84 to the right-hand side. Correspondingly, for example, a pivoting of the inner tube 17 downwardly results in a pivoting of the inner tube 84 upwardly.

In a practical embodiment of the aiming telescope 10 this coupling results in a precision of the range finder of about 0.5 m at a distance of 1,000 m.

FIG. 10, further, shows the electrical energy supply of aiming telescope 10.

The outer tube 76 of range finder 13 is provided at its rearward end with a, for example, cylindrical cavity 140. The cavity 140 is used for receiving a battery 142 which, preferably, is a photo battery. The battery 142 is held at its end shown right in FIG. 10 by a spring 144 being arranged on the inner side of a screw cap 146. The screw cap 146 may be screwed manually and, for that purpose, is provided with an outer knurling 148 at its free end.

A positive electrode 150 of the battery 142 is arranged on the left-hand side in the embodiment shown. It is contacted by a contact pin 152 being supported against the housing via a spring 154. By doing so it is avoided that a too large force is exerted on the positive electrode 150 when an impact acts in an axial direction, wherein a too large force could result in a damage of the ceramic component being arranged below the positive electrode in batteries of the kind of interest in the present context. A first cable 156 is guided from the contact pin 152 to a circuit board 159 on which, inter alia, the receiver 49 is arranged. A second cable 158 interconnects the circuit board 159 with the range finder 13.

Figure 12:
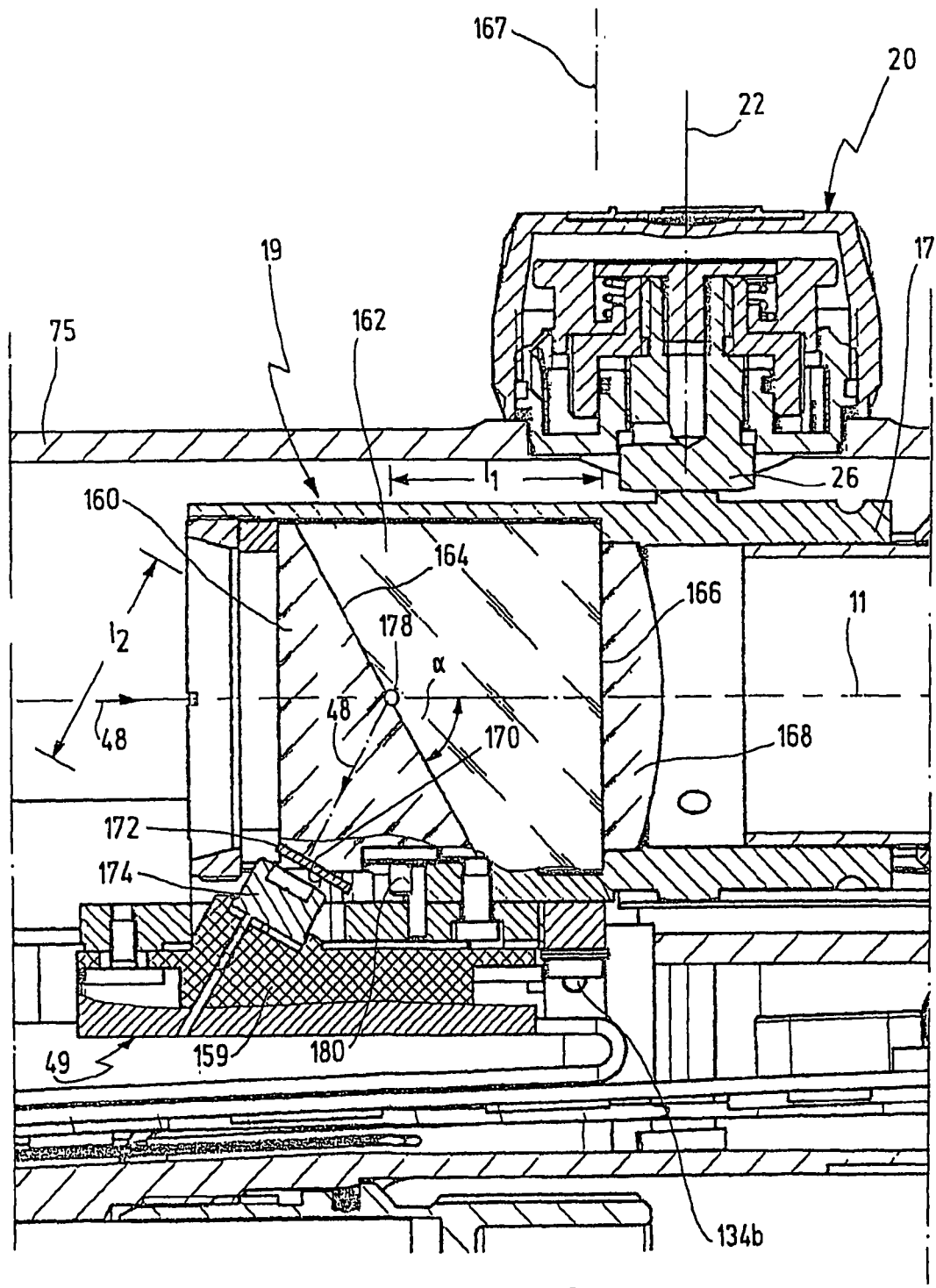
FIG. 12 on an enlarged scale shows a third detail from a middle, upper area of the horizontal cross-sectional view of FIG. 8.

FIG. 12 shows the middle upper area in FIG. 8, namely essentially the beam splitter 19.

The beam splitter 19 essentially consists of an objective lens sided first prism 160 as well as an eyepiece sided second prism 161 which adjoin each other along a boundary plane 164. The boundary plane 164 encloses an angle α being within the range of between 50° and 70° and being preferably about 60° with the optical axis 11 instead of the conventional angle of 45°.

With such a beam splitter 19 the layer system in the area of the boundary plane 164 may be drastically simplified. The beam splitter 19 optimizes the transmission within the visual range as well as in the range of the light with the wavelength of the laser diode 92. In a conventional beam splitter having an angle of 45° about 80 layers must be applied for an optimum beam splitting. This requires a very sensible vapor deposition process. In such a process there is always the risk of a non-stable layer system having individual layers that tend to crack. Moreover, such a process is very expensive because the costs increase with the number of individual layers. With a beam splitter having an angle of about 60° relative to the axis or about 30° relative to a radial plane, the number of layers may instead be reduced to about 60, under certain circumstances even to 40. A further reduction would result if the angle of 60° would still be increased or the input angle of 30° would be still decreased, however, this would require additional space.

According to the invention, the layers are preferably configured of hafnium- and silicon oxides, namely in an alternating manner. It is intended to obtain the thinnest possible layer thickness in order to minimize the generation of stray light.

In a practical embodiment the reflection ratio for a 60°/30° beam splitter is about 90% for light of 905 nm wavelength. In a conventional 45° beam splitter this ratio would be only about 60%.

An eyepiece sided surface 163 of the second prism 160 defines the first image plane 167 of the aiming telescope 10. A field lens 168 is cemented onto the surface 163. This has the advantage that no dirt may be deposited between the second prism 160 and the field lens 168. Further, two anti-reflection layers less are required. As there is no air-filled space between the second prism 160 and the field lens 168, one also achieves a high transmission.

A lower corner 170 of the first prism 160 shown left in FIG. 12 is flattened by about 30° relative to the optical axis 11. Parallel to this corner 170 there is arranged a cut-off filter 172 consisting, preferably, of two individual cut-off filters cemented one onto the other. The cut-off filter 172 configures a band pass filter which transmits light only in a very narrow wavelength range of, for example, 905 nm±3-5 nm, i.e. the wavelength of the light of laser diode 92.

Below the cut-off filter 172 a sensor 174 is seated, i.e. an element being sensible for the wavelength of the light of the laser diode 92. The sensor 174, for example, has a sensor area with a diameter of 0.2 mm. For a focal length of 150 mm this corresponds to an aperture angle of 1.7 mrad. The sensor 174 is aligned on the received measuring beam 48 which, in the illustration of FIG. 12, runs along the optical axis 11 through the aiming telescope 10 and is reflected in a point of impingement 178 on the boundary plane 164 being inclined by 60°. Accordingly, the received measuring beam 48 runs with an incoming angle of 90° through the cut-off filter 172 and then impinges onto the sensor 174.

The sensor 174 is calibrated relative to the first image plane 167, namely such that the distance $I_1$ between the point of impingement 178 and the first image plane 167 is equal to the distance $I_2$ between the point of impingement 178 and the sensor 174. In the embodiment shown a tolerance of ±3 mm is allowed. Thereby, image errors are avoided.

The sensor 174 together with the receiver 49 and the circuit board 159 are directly connected to the inverting system 18, namely to the inner tube 17. This means that during the assembly there is only once the need for calibration.

The beam splitter 19 is attached by a mechanical form-fitting connection to the inverting system 18, thereby preventing relative rotation. In FIG. 12 this is indicated by a nipple 180.

Figure 13:
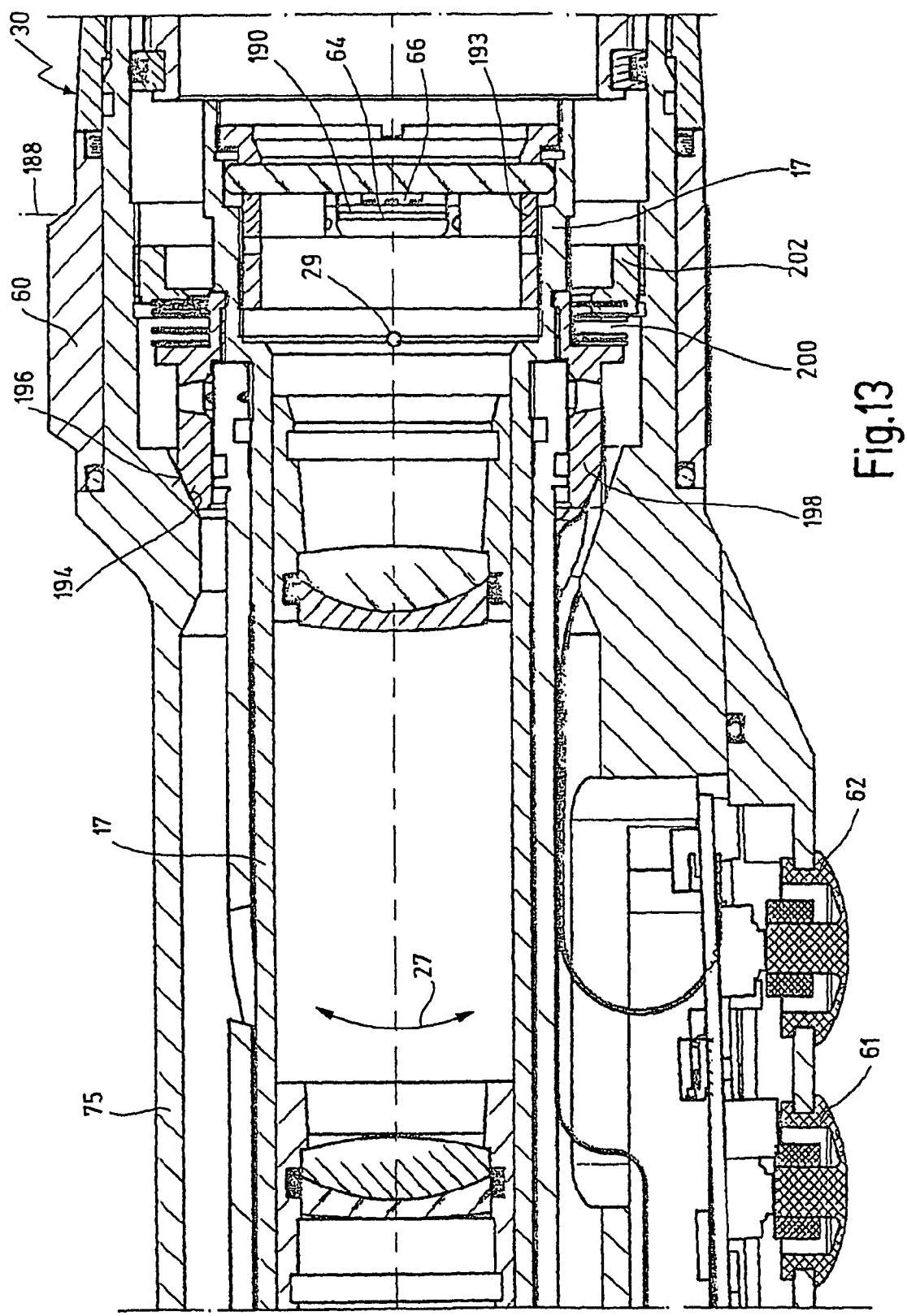
FIG. 13 on an enlarged scale shows a fourth detail from the eyepiece sided area of the horizontal cross-sectional view of FIG. 8.

FIG. 13 shows the area on the right-hand side of FIG. 8, namely essentially the bearing of the inner tube 17.

A second image plane 188 may be seen in FIG. 13 at the axial position of a reticle 190, wherein an axial tolerance of ±1 mm is allowed. The reticle 190 carries an aiming mark, in the embodiment shown accordingly the crosshairs 64 already mentioned in connection with FIG. 6. Further, the display is arranged below the reticle 190, below the drawing plane of FIG. 13. Due to this arrangement of the display 66 directly within the image field, there is no need for a further beam splitter within the beam path which would involve a corresponding weight and transmission losses.

In contrast to many conventional aiming telescopes the reticle 190 is rigidly connected to the inverting system 18. For that purpose an annular frame 193 is provided with which the reticle 190 is rigidly connected with the inner tube 17. In this way the reticle 190 is always centered within the center of the image field.

A conical seat 194 is configured at the inner side of outer tube 75 of the aiming telescope 10 shortly in front of the second image plane 188. A ball head 196 rests in this conical seat 194. The ball head 196 is configured at the front end of a first annular flange 198. The first annular flange 198 is rigidly seated on the inner tube 17. It is biased axially by means of a zig-zag spring 200 in the direction towards the objective lens 16, such that the ball head 196 is supported against the conical seat 194 with the force of the zig-zag spring 200. The zig-zag spring 200 is seated at the eyepiece sided end against a second annular flange 202 being connected to the outer tube 75.

The conical seat 194, together with the ball head 196, therefore, configure an articulation, the articulation point 29 of which being already shown in FIG. 1. The inverting system 18 may thus be pivoted or articulated in this way about the articulation point 29 at the eyepiece sided end of the inner tube 17, such that the objective lens sided free end of the inner tube 17 together with the beam splitter 19 and the receiver 49 may be pivoted in a horizontal and in a vertical direction, as also indicated in FIG. 13 with an arrow 27. By taking along the second fork 118 via the pins 134a, 134b being rigidly connected with the beam splitter 19, the lever 46 is pivoted in an opposite direction relative to the inner tube 17 and, hence, the light pen 79 is moved such that the emitted measuring beam 15 impinges on the sighted target at any time.

FIG. 14 shows further details in a radial cross-sectional view, namely details at the position of the turrets 20 (lateral) and 21 (vertical) together with their action on the alignment of inner tube 17. Further, one can clearly see the arrangement of the measuring electronics between the range finder 13 and the inner tube 17, as well as the configuration and positioning of the rail 58.

The invention claimed is:

1. An aiming telescope having an optical axis and a line of sight, first means for adjusting a direction of said line of sight, a range finder being structurally connected with said aiming telescope, said range finder having a light source for emitting an emitted measuring beam, said emitted measuring beam running outside said aiming telescope and having a direction coinciding essentially with said direction of said line of sight, and second means for automatically adjusting said direction of said emitted measuring beam when said direction of said line of sight is adjusted, wherein said light source is pivotable relative to said aiming telescope, and said second means are configured as a transmission acting between said aiming telescope and said light source.

2. The aiming telescope of claim 1, wherein said first means are provided for manually adjusting said direction of said line of sight.

3. The aiming telescope of claim 2, wherein said first means are provided with a first adjustment element for aligning said line of sight within a horizontal plane and a second adjustment element for aligning said line of sight in a vertical plane.

4. An aiming telescope having an optical axis and a line of sight, first means for adjusting a direction of said line of sight, a range finder being structurally connected with said aiming telescope, said range finder having a light source for emitting an emitted measuring beam, said emitted measuring beam running outside said aiming telescope and having a direction coinciding essentially with said direction of said line of sight, and second means for automatically adjusting said direction of said emitted measuring beam when said direction of said line of sight is adjusted, wherein said range finder is pivotably mounted on said aiming telescope, and said second means are configured as a transmission acting between said aiming telescope and said range finder, and further wherein said range finder is pivoted in a direction opposite to that of said line of sight.

5. The aiming telescope of claim 4, wherein said transmission is configured as a lever transmission.

6. An aiming telescope having an optical axis and a line of sight, first means for adjusting a direction of said line of sight, a range finder being structurally connected with said aiming telescope, said range finder having a light source for emitting an emitted measuring beam, said emitted measuring beam running outside said aiming telescope and having a direction coinciding essentially with said direction of said line of sight, and second means for automatically adjusting said direction of said emitted measuring beam when said direction of said line of sight is adjusted, wherein said light source is pivotably mounted on said aiming telescope, and said second means are configured as a lever transmission acting between said aiming telescope and said light source, and further wherein said light source is articulated at an objective lens sided end of said aiming telescope and that an inverting system is articulated at an eyepiece sided end of said aiming telescope, and that free ends of said light source and of said inverting system facing each other are interconnected in articulation by a lever.

7. The aiming telescope of claim 6, wherein said light source is journaled in a ball bearing at said objective lens sided end of said aiming telescope.

8. The aiming telescope of claim 6, wherein said inverting system is seated in a cone/ball bearing at said eyepiece sided end of the aiming telescope.

9. The aiming telescope of claim 6, wherein said lever is rigidly connected to said free end of said light source and is connected in articulation with said free end of said inverting system.

10. The aiming telescope of claim 9, wherein said lever is connected with said free end of said light source so as to be adjustable in a first direction.

11. The aiming telescope of claim 10, wherein said lever is provided at an objective lens sided end thereof with a first fork, first prongs of said first fork embracing a stub at said free end of said light source, and said first prongs being adapted to be shifted in a longitudinal direction thereof on said stub and to be fixed at a predetermined position.

12. The aiming telescope of claim 7, wherein said lever is provided with a second fork at an eyepiece sided end thereof, second prongs of said second fork being provided with longitudinal grooves, and pins being connected to said inverting system running within said longitudinal grooves.

13. The aiming telescope of claim 11, wherein said lever is provided with a second fork at its eyepiece sided end, second prongs of said second fork being provided with longitudinal grooves, and pins connected to said inverting system running within said longitudinal grooves, wherein, further, said first fork defines a first plane with its first prongs, said second fork defines a second plane with its second prongs, and said first plane and said second plane enclosing a right angle.

14. The aiming telescope of claim 10, wherein said lever has an objective lens sided front part and an eyepiece sided rear part, said parts being interconnected such as to be adjusted along a second direction.

15. The aiming telescope of claim 14, wherein said first direction and said second direction enclose a right angle.

16. The aiming telescope of claim 11, wherein said lever has an objective lens sided front part and an eyepiece sided rear part, said parts being interconnected such as to be adjusted along a second direction, wherein, further, said front part is provided with said first fork.

17. The aiming telescope of claim 12, wherein said lever has an objective lens sided front part and an eyepiece sided rear part, said parts being interconnected such as to be adjusted along a second direction, wherein, further, said rear part is provided with said second fork.

18. The aiming telescope of claim 6, wherein said free end of said inverting system is configured by a free end of an inner tube of said aiming telescope.

19. The aiming telescope of claim 1, wherein said transmission is configured as a cable transmission.

20. The aiming telescope of claim 1, wherein said transmission is configured as a servo drive.

21. An aiming telescope having an optical axis and a line of sight, first means for adjusting a direction of said line of sight, a range finder being structurally connected with said aiming telescope, said range finder having a light source for emitting an emitted measuring beam, said emitted measuring beam running outside said aiming telescope and having a direction coinciding essentially with said direction of said line of sight, and second means for automatically adjusting said direction of said emitted measuring beam when said direction of said line of sight is adjusted, wherein said light source is pivotably mounted on said aiming telescope, and said second means are configured as a cable transmission acting between said aiming telescope and said light source, and further wherein said cable transmission engages an inverting system within said aiming telescope.

22. An aiming telescope having an optical axis and a line of sight, first means for adjusting a direction of said line of sight, a range finder being structurally connected with said aiming telescope, said range finder having a light source for emitting an emitted measuring beam, said emitted measuring beam running outside said aiming telescope and having a direction coinciding essentially with said direction of said line of sight, and second means for automatically adjusting said direction of said emitted measuring beam when said direction of said line of sight is adjusted, wherein said light source is pivotably mounted on said aiming telescope, and said second means are configured as a transmission acting between said aiming telescope and said light source, and further wherein said transmission has a transmission ratio depending on a focal length of said aiming telescope.

23. The aiming telescope of claim 1, wherein said light source comprises a laser diode.

24. The aiming telescope of claim 1, wherein said light source has a focal length of about 12 mm.

25. The aiming telescope of claim 1, comprising an objective lens having at least one individual lens being rigidly connected to an outer tube of said aiming telescope.

26. The aiming telescope of claim 1, comprising an electric current supply with a battery, said battery being resiliently held axially at a positive electrode thereof.

27. The aiming telescope of claim 26, wherein said battery is housed in a cavity configuring a rearward extension of said range finder.

28. The aiming telescope of claim 1, comprising an inverting system, said inverting system having a beam splitter at an objective lens sided end thereof.

29. An aiming telescope having an optical axis and a line of sight, and comprising an inverting system having a beam splitter at an objective lens sided end thereof and first means for adjusting a direction of said line of sight, a range finder being structurally connected with said aiming telescope, said range finder having a light source for emitting an emitted measuring beam, said emitted measuring beam running outside said aiming telescope and having a direction coinciding essentially with said direction of said line of sight, and second means for automatically adjusting said direction of said emitted measuring beam when said direction of said line of sight is adjusted, wherein said light source is pivotably mounted on said aiming telescope, and said second means are configured as a transmission acting between said aiming telescope and said light source, and further wherein said beam splitter comprises a first prism and a second prism, said prisms adjoining each other in a boundary plane, said boundary plane and said optical axis enclosing an angle in a range of between 50° and 70°.

30. The aiming telescope of claim 29, wherein said angle is 60°.

31. The aiming telescope of claim 29, wherein a layer system within said boundary plane has a maximum of sixty individual layers.

32. The aiming telescope of claim 31, wherein said layer system comprises a maximum of forty individual layers.

33. The aiming telescope of claim 31, wherein said layer system is composed of alternating hafnium layers and silicon oxide layers.

34. The aiming telescope of claim 29, wherein a received measuring beam impinging along said optical axis on an objective lens sided first prism is deflected at said boundary plane away from said optical axis, said received measuring beam then running through said first prism, exiting from said first prism at a surface thereof and being guided onto a sensor, a sensor surface of which being arranged parallel to said prism surface.

35. The aiming telescope of claim 34, wherein said received measuring beam is deflected to impinge under right angles onto said sensor surface.

36. The aiming telescope of claim 35, wherein said first prism is provided with a flattened corner at an objective lens sided lower edge thereof, said corner surface being inclined relative to said optical axis such that a received measuring beam coming in along said optical axis and being reflected at said inclined boundary plane impinges under right angles on said surface of said flattened corner.

37. The aiming telescope of claim 34, wherein a band pass filter is provided upstream said sensor.

38. The aiming telescope of claim 37, wherein said band pass filter is arranged between said first prism and said second prism.

39. The aiming telescope of claim 38, wherein said band pass filter is configured as a cutoff-filter.

40. The aiming telescope of claim 39, wherein said cut-off filter consists of two individual filters being cemented onto each other.

41. The aiming telescope of claim 29, wherein an eyepiece sided surface of said objective lens sided second prism defines a second image plane of said aiming telescope.

42. The aiming telescope of claim 41, wherein a received measuring beam impinging along said optical axis on an objective lens sided first prism is deflected at a point of impingement on said boundary plane away from said optical axis, said received measuring beam then running through said first prism, exiting from said first prism at a surface thereof and being guided onto a sensor surface of a sensor, wherein, further, a distance between said point of impingement and said second image plane is as large as a distance between said point of impingement and said sensor surface.

43. The aiming telescope of claim 41, wherein a field lens is cemented on said eyepiece sided surface of said second prism.

44. The aiming telescope of claim 28, wherein said beam splitter is arranged within said inverting system in a form-fitting manner so as to be secured against rotation.

45. The aiming telescope of claim 6, wherein said inverting system is journaled in a cone/ball bearing at said eyepiece sided end of said aiming telescope.

46. An aiming telescope having an optical axis and a line of sight, and comprising an inverting system having a beam splitter at an objective lens sided end thereof and first means for adjusting a direction of said line of sight, a range finder being structurally connected with said aiming telescope, said range finder having a light source for emitting an emitted measuring beam, said emitted measuring beam running outside said aiming telescope and having a direction coinciding essentially with said direction of said line of sight, and second means for automatically adjusting said direction of said emitted measuring beam when said direction of said line of sight is adjusted, wherein said light source is pivotable relative to said aiming telescope, and said second means are configured as a transmission acting between said aiming telescope and said light source, and further wherein said inverting system is journaled in a cone/ball bearing at an eyepiece sided end of said aiming telescope, and said cone/ball bearing is configured by an inner conical seat on an inner surface of an outer tube of said aiming telescope and by a ball head arranged at said eyepiece sided end of an inner tube of said aiming telescope.

47. The aiming telescope of claim 46, wherein said ball head is supported against said outer tube via a spring.

48. The aiming telescope of claim 6, wherein a second image plane is configured at an eyepiece sided end of said inverting system.

49. The aiming telescope of claim 48, wherein a reticle is arranged within said inverting system essentially at a location of the second image plane.

50. The aiming telescope of claim 49, wherein said reticle is rigidly connected to said inverting system.

51. The aiming telescope of claim 49, wherein a display for an alphanumerical indication is arranged within a field of vision on said eyepiece side of said reticle located essentially at said second image plane.

52. The aiming telescope of claim 51, wherein said reticle is adapted to be illuminated, that a illumination intensity is adapted to be adjusted, and that a light intensity of an alphanumerical indication of said display is adapted to be adjusted depending on said illumination intensity of said reticle.

53. The aiming telescope of claim 52, wherein for adjusting said illumination intensity of said reticle there is provided on said aiming telescope at least one actuation knob, and that said at least one actuation knob is also adapted to switch said illumination off.

54. The aiming telescope of claim 53, wherein for increasing or decreasing said illumination intensity of said reticle there are provided two actuation knobs, and that said illumination is adapted to be switched on and off, resp., by simultaneous actuation of both actuation knobs.

55. The aiming telescope of claim 1, wherein a switch for actuating said range finder is provided, wherein said switch effects an emission of a short-time emitted measuring beam, and that means are provided for enabling said emission of another emitted measuring beam only after a predetermined time interval has lapsed.

56. The aiming telescope of claim 55, wherein said switch is adapted to be operated remotely.

57. The aiming telescope of claim 1, wherein a rail is provided for affixing said rail to a firearm, and that said rail and said range finder are arranged at peripheral positions of said aiming telescope being offset by 90°.

58. The aiming telescope of claim 1, wherein said first means is configured for adjusting said line of sight by adjusting the position of an optical subassembly within said aiming telescope, and further wherein said second means is responsive to movement of said optical subassembly for adjusting the position of said light source to automatically adjust said direction of said emitted measuring beam.

59. The aiming telescope of claim 58, wherein said light source is pivoted in a direction opposite to that of said line of sight.

60. The aiming telescope of claim 59, wherein said transmission is configured as a lever transmission.

* * * * *